Feb. 1, 1944.  V. A. TRIER  2,340,629
FLEXIBLE MOUNTING FOR INSTRUMENTS AND OTHER APPARATUS
Filed Nov. 27, 1942

Inventor
V. A. TRIER
By
[signature]
Attorneys

Patented Feb. 1, 1944

2,340,629

UNITED STATES PATENT OFFICE 2,340,629

FLEXIBLE MOUNTING FOR INSTRUMENTS AND OTHER APPARATUS

Vernon Anthony Trier, London, England, assignor to Silentbloc Limited, London, England, a company of Great Britain Application November 27, 1942, Serial No. 467,154
In Great Britain January 12, 1942

1 Claim. (Cl. 248—358)

This invention relates to flexible mountings of the kind comprising concentric inner and outer members connected together by a rubber or like flexible annulus, the outer circumferential edge of which engages the outer member or housing whilst its bore or inner circumferential edge is engaged by the inner member. Such mountings are used for supporting instruments and other apparatus so as to isolate them from shock or vibration.

Mountings of the above type necessarily have a considerable degree of flexibility and the object of the present invention is to provide means to protect the mounting and the apparatus it supports if it is deflected beyond a predetermined extent.

According to this invention the outer circumferential edge or rim of the flexible annulus is provided with projecting portions which extend through slots formed in one or both faces of the housing in which the rim is mounted. These projections, which are integral with the thickened rubber rim, thus form buffers which come into operation if the mounting is deflected as a result of shock, vibration or impact, above its normal loading capacity. The buffers may project to an equal extent in the axial direction from each face of the housing and they may be equally spaced apart from one another so as to provide an adequate cushioning surface without weakening the metal or other housing in which the rim is mounted.

Figure 1:
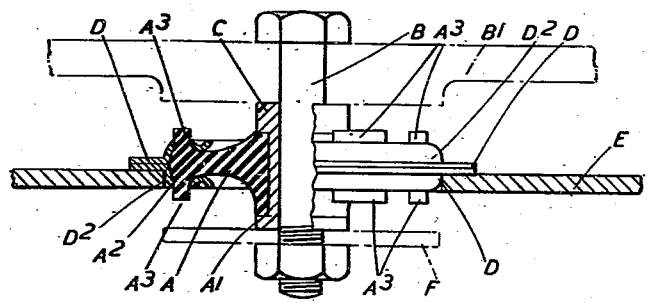
Figure 2:
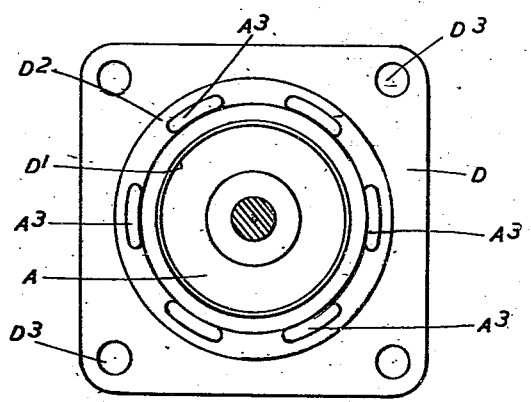

A flexible mounting constructed in accordance with this invention is illustrated by way of example in the accompanying drawing, in which Figure 1 is a side elevation partly in section, and Figure 2 is a plan of the mounting alone.

In the construction shown the mounting comprises a rubber or like flexible annulus A having an enlarged central boss $A^1$ and a thickened circumferential rim $A^2$. The boss $A^1$ supports a metal bush C adapted to receive a bolt B by which the mounting can be secured to a support $B^1$.

The thickened rim $A^2$ of the annulus is engaged by a housing formed from two similar metal plates D which are substantially rectangular in plan and each provided with a central aperture $D^1$ surrounded by a flanged portion $D^2$ adapted to accommodate one half of the thickened rim $A^2$ when the two plates are connected together face to face.

At intervals around the flanged portion $D^2$ of the housing slots are formed and through these extend in an axial direction projections $A^3$ formed on the opposite edges of the rim $A^2$ and integral therewith. The projections $A^3$ constitute buffers and are conveniently spaced apart equally from one another around the rim. These buffers form cushions which come into operation if the mounting is deflected as a result of shock, vibration or impact above its normal capacity. The corners of the rectangular housing are provided with perforations $D^3$ through which rivets or the like can be passed to secure the housing to a plate or other instrument-carrying member E, and if excesssive deflection of the mounting occurs, the buffers $A^3$ will come into contact with the support $B^1$ or with an abutment—such as that indicated at F in Figure 1—in the opposite direction. Thus the metal housing itself is prevented from coming into contact with a support on either side of the annulus by means of the buffers $A^3$ so that the instruments which may be mounted on the board or plate E are protected from shock.

The buffers $A^3$ need not project to an equal extent in the axial direction on each side of the annulus and in some cases they only operate in one direction. The projections $A^3$, however, in addition form an improved anchorage between the rim $A^2$ and its metal housing $D^2$ and an improved mounting is provided without increasing the number of parts or complicating the assembly in any way.

The two plates D from which the housing is made can be secured by spot welding or in any other convenient manner and in its unstressed state the portion of the annulus between the central boss and the rim may be of shallow frusto-conical form as shown or of any other convenient shape without departing from the invention.

What I claim as my invention and desire to secure by Letters Patent is:

A flexible mounting comprising a flexible annulus, an inner member engaged by the bore of said annulus, an outer member constituting a housing for the outer circumferential rim of the annulus, and projections extending through slots formed in at least one face of the housing forming buffers which come into operation if the mounting is deflected beyond a predetermined extent.

VERNON ANTHONY TRIER.